US007701082B2

(12) United States Patent
Lazarovich et al.

(10) Patent No.: US 7,701,082 B2
(45) Date of Patent: Apr. 20, 2010

(54) AEROSPACE ELECTRICAL POWER DC SUBSYSTEM CONFIGURATION USING MULTI-FUNCTIONAL DC/DC CONVERTER

(75) Inventors: David Lazarovich, Thornhill (CA); Srinivasa R. Dangeti, Razole (IN); Ileana Rusan, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 286 days.

(21) Appl. No.: 11/589,196

(22) Filed: Oct. 30, 2006

(65) Prior Publication Data
US 2008/0100135 A1 May 1, 2008

(51) Int. Cl.
*H02J 3/02* (2006.01)
*H02J 3/38* (2006.01)
*H02J 5/00* (2006.01)
*B64D 41/00* (2006.01)

(52) U.S. Cl. .............................. 307/22; 307/19; 307/21; 307/26; 307/45; 307/46; 244/58

(58) Field of Classification Search .................... 307/46, 307/19, 21, 22, 26, 45, 82; 244/53 A, 58, 244/60
See application file for complete search history.

(56) References Cited
U.S. PATENT DOCUMENTS 4,298,926 A 11/1981 Black
5,027,264 A 6/1991 DeDoncker et al.
5,394,075 A 2/1995 Ahrens et al.
5,745,351 A 4/1998 Taurand
5,850,113 A 12/1998 Weimer et al.
5,914,542 A 6/1999 Weimer et al.
5,982,156 A 11/1999 Weimer et al.
6,021,052 A 2/2000 Unger et al.
6,243,277 B1 6/2001 Sun et al.
6,487,096 B1 11/2002 Gilbreth et al.
6,577,106 B2 * 6/2003 Lazarovich ................. 320/137
6,583,519 B2 6/2003 Aberle et al.
6,700,802 B2 3/2004 Ulinski et al.
6,765,306 B2 7/2004 Fattic
6,825,640 B1 11/2004 Hill et al.
6,873,134 B2 3/2005 Canter et al.
6,882,063 B2 4/2005 Droppo et al.
6,949,843 B2 9/2005 Dubovsky

* cited by examiner

*Primary Examiner*—Albert W Paladini
*Assistant Examiner*—Hal I Kaplan
(74) *Attorney, Agent, or Firm*—Oral Caglar, Esq.

(57) ABSTRACT

An apparatus for regulating voltage and aerospace electrical power systems are implemented. A multi-functional apparatus for regulating voltage, according to one embodiment, comprises: a DC to DC converter (315), wherein the DC to DC converter (315) is controlled to operate in a first direction to receive a DC voltage from a first bus (329) and to output a first regulated DC voltage adjusted to charge a battery (307), wherein the first bus (329) receives power from a second bus (201), and is controlled to operate in a second direction to receive a battery DC voltage from the battery (307) and to output a second regulated DC voltage to the first bus (329) to power a load (231) independently or in combination with the second bus (201).

6 Claims, 3 Drawing Sheets

AEROSPACE ELECTRICAL POWER DC SUBSYSTEM CONFIGURATION USING MULTI-FUNCTIONAL DC/DC CONVERTER

BACKGROUND OF THE INVENTION

1. Field of the Invention

The present invention relates to electrical systems, and more particularly to a DC to DC converter for an electrical power system.

2. Description of the Related Art

Electric systems used in complex environments such as aerospace systems, more electric aircraft systems, industrial environments, vehicles, etc., include a large number of electric systems and modules. During operation of complex environments, various electric systems and modules may need to be connected to electric power, disconnected from electric power, maintained in a powered-up state, etc., at various times. Moreover, various electric systems and modules in a complex environment may require amounts and type of electrical power specific to each system/module. The power levels required by various parts of the complex environment may also depend on the operational stage of the environment. For example, different levels of power may be needed during the start-up of main engines or auxiliary engine, during continuous operation, or during a battery recharge, in a complex environment such as an aircraft.

On present aircraft systems, three distinct sets of hardware are needed to start an auxiliary power unit (APU) or an engine, and supply the main DC power, such as, for example 28 Vdc power. The three distinct sets of hardware are an AC/DC and DC/AC converter system for starting the APU or engine, a Transformer Rectifier Unit (TRU) or Regulated Transformer Rectifier Unit (RTRU) for the supply of the main DC power, such as 28 Vdc main power, and a battery charger for charging a battery. The large number of units used to provide main DC power and engine start power, negatively impact the reliability of the aircraft, as failure or malfunction of one of the units will affect the power availability and the start procedures. Moreover, the large number of units leads to weight, volume, and cost increases for the aircraft.

Disclosed embodiments of this application address these and other issues by utilizing a multi-functional DC/DC converter that is used as a main DC supply source and as a battery charger when operating in a forward direction, and as a battery power converter to supply power for a starting APU converter, when operating in a reverse direction. The multi-functional DC/DC converter replaces multiple units: the TRU or RTRU, and the battery charger. An aerospace electrical power DC subsystem using the multi-functional DC/DC converter to start an APU or engine, and recharge a battery, leads to significant weight, volume and cost savings, and provides more reliable power functions for an aircraft.

SUMMARY OF THE INVENTION

The present invention is directed to an apparatus for regulating voltage and to aerospace electrical power systems. According to a first aspect of the present invention, a multi-functional apparatus for regulating voltage comprises: a DC to DC converter, wherein the DC to DC converter is controlled to operate in a first direction to receive a DC voltage from a first bus and to output a first regulated DC voltage adjusted to charge a battery, wherein the first bus receives power from a second bus, and is controlled to operate in a second direction to receive a battery DC voltage from the battery and to output a second regulated DC voltage to the first bus, to power a load independently or in combination with the second bus.

According to a second aspect of the present invention, an aerospace electrical power DC system comprises: a battery; a bi-directional DC to DC converter operating in a first direction and in a second direction, wherein in the first direction, the DC to DC converter receives a DC voltage from an AC power bus through a rectification system operationally connected to the AC power bus, and outputs a first regulated DC voltage to a constant voltage bus to charge a battery, and in the second direction, the DC to DC converter receives a battery DC voltage from the battery and outputs a second regulated DC voltage for starting a load independently or in combination with the AC power bus.

According to a third aspect of the present invention, an aerospace DC power supply system utilizes a single DC to DC converter to supply a constant DC power bus using rectified power from an aircraft AC bus, and charge a battery continuously connected to the constant DC power bus, wherein the system further utilizes the single DC to DC converter to start an auxiliary power unit using the battery, upon experiencing a condition that power from the aircraft AC bus is insufficient or not available to start the auxiliary power unit.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
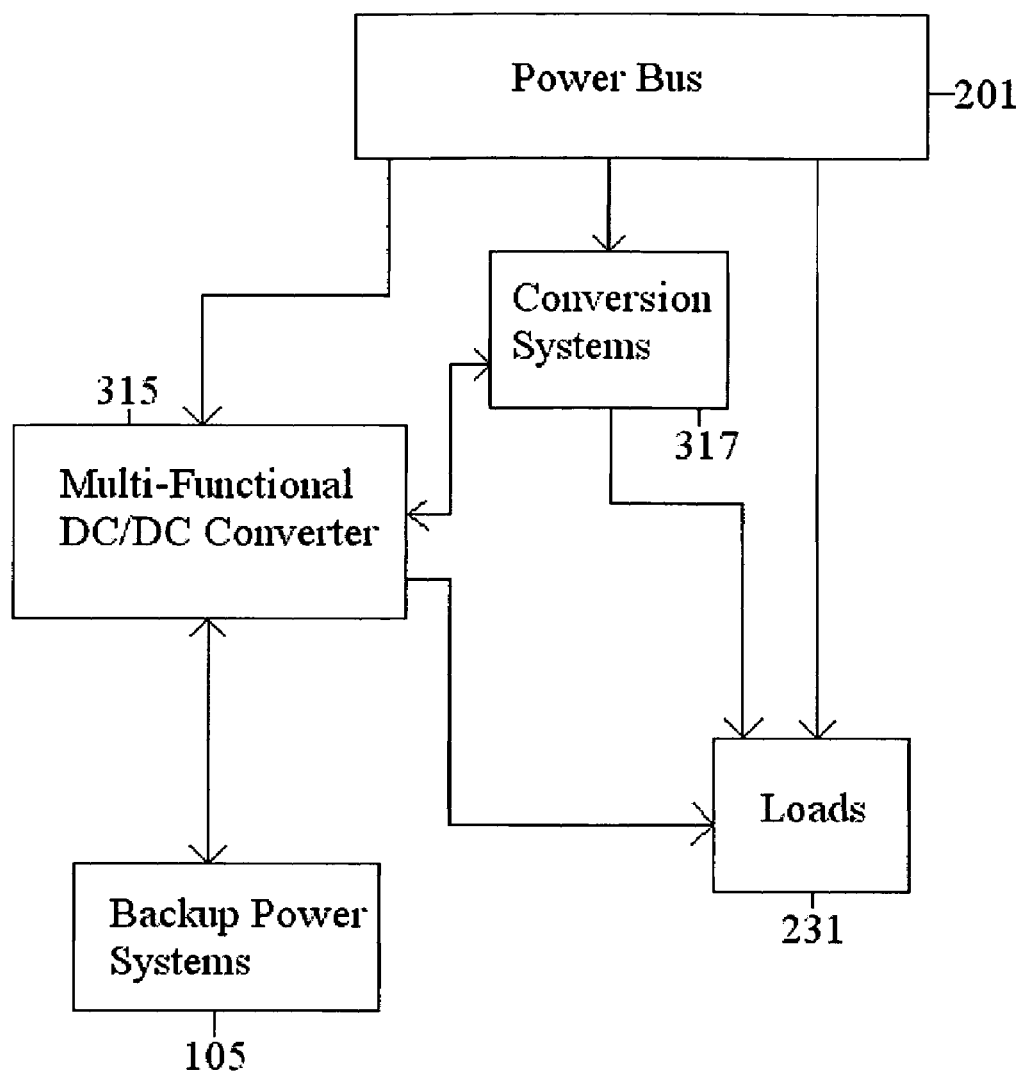
FIG. 1 is a general block diagram of an electrical system using a multi-functional DC/DC converter according to an embodiment of the present invention.

Aspects of the invention are more specifically set forth in the accompanying description with reference to the appended figures. FIG. 1 is a general block diagram of an electrical system using a multi-functional DC/DC converter according to an embodiment of the present invention. The electrical system 100 illustrated in FIG. 1 includes the following components: a power bus 201; conversion systems 317; loads 231; backup power systems 105; and a multi-functional DC/DC converter 315. Operation of the electrical system 100 in FIG. 1 will become apparent from the following discussion.

Electrical system 100 may be associated with environments with electrical components, such as an aircraft, a ship, a train, a laboratory facility, etc. Power bus 201 provides electrical power to loads 231, either directly or through conversion systems 317. Power bus 201 handles wattage power that can be on the order of W, kW, hundreds of kW, MW, etc., and voltages that can be on the order of Volts, hundreds to thousands of Volts, etc. The power bus 201 is supplied by generators, transformer-rectifiers, etc.

Conversion systems 317 receive energy from power bus 201, and provide electrical energy to loads 231. Conversion systems 317 include electrical circuits and components such as transformers, rectifiers, converters, filters, etc.

Loads 231 are systems that enable functioning of services onboard a vehicle, in an aircraft, in a lab, etc. Loads 231 may include an auxiliary power unit, an engine start generator, a cabin air compressor, etc.

Backup power systems 105 include energy storage devices, such as batteries, fuel cells, capacitors, etc. The backup power systems 105 are charged by energy provided by the multi-functional DC/DC converter 315. The backup power systems 105 may also use their stored energy to power loads 231, via the multi-functional DC/DC converter 315.

Although the systems in electrical system 100 are shown as discrete units, it should be recognized that this illustration is for ease of explanation and that the associated functions of certain functional modules or systems can be performed by one or more physical elements.

Figure 2:
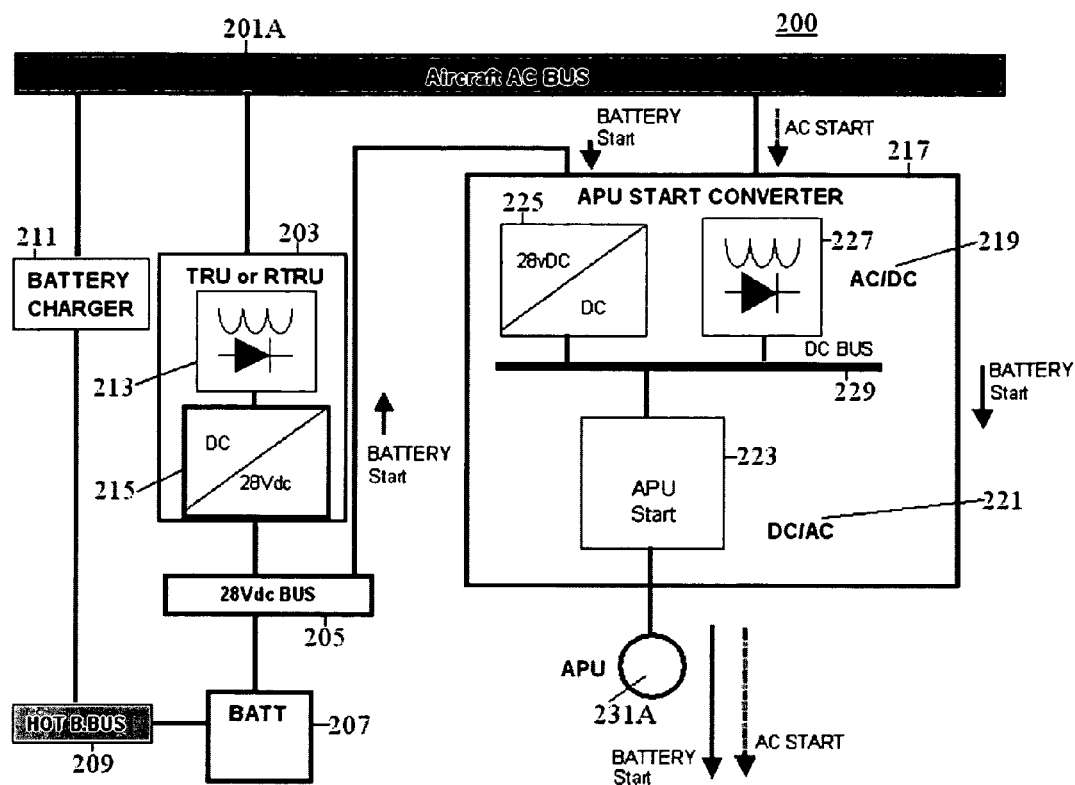
FIG. 2 is a block diagram of a typical/conventional subsystem for aircraft.

FIG. 2 is a block diagram of a typical/conventional power subsystem 200 for aircraft. On present aircraft, starting an auxiliary power unit (APU) or engine, and supplying main 28 Vdc power, make use of three distinct sets of hardware: an AC/DC+DC/AC converter for starting the APU or engine; a Transformer Rectifier Unit (TRU) or Regulated Transformer Rectifier Unit (RTRU) for the supply of 28 Vdc main power; and a battery charger for battery charging.

The TRU 203 for the supply of 28 Vdc main power includes a transformer and a rectifier 213. The RTRU 203 for the supply of 28 Vdc main power includes a transformer or autotransformer, a rectifier 213, and a DC/DC 28 Vdc converter 215. The TRU or RTRU 203 receives AC power from the aircraft AC bus 201A, and outputs DC power to the 28 Vdc bus 205. A TRU is unsuitable for charging batteries that are used as backup power sources or auxiliary power supplies, because a TRU has a varying output voltage which does not enable a constant potential charging mode or constant current charging mode. A RTRU can provide a constant output DC voltage and hence charge batteries at constant potential. However, a classic RTRU does not limit the current flowing into the battery, and does not control the amount of trickle charge, which leads to battery electrolyte loss. Because of the problems TRUs and RTRUs pose for battery charging, a separate battery charger 211 is typically used to charge the batteries 207 used as backup power sources or auxiliary power supplies.

The battery charger 211 receives power from the aircraft AC bus 201A, and outputs power to the hot battery bus 209 and to battery 207. Hence, the 28 Vdc bus 205 also receives DC power from battery 207.

Having received DC power from the battery 207, the 28 Vdc bus 205 then provides 28 Vdc for start of the APU start converter 217 and consequently of the APU 231A.

As illustrated in FIG. 2, an AC/DC converter 219 and a DC/AC converter 221 are part of the APU start converter 217. The AC/DC converter 219 includes a 28 Vdc DC/DC converter 225 and a rectifier 227. When power is drawn from the 28 Vdc bus 205 (the "battery start" process), the 28 Vdc DC/DC converter 225 converts the 28V voltage coming from the 28 Vdc bus 205 to the DC voltage level required for the DC bus 229. When power is drawn from the aircraft AC bus 201A (the "AC start" process), the rectifier 227 converts the AC voltage coming from the aircraft AC bus 201A to a DC voltage for the DC bus 229. The DC/AC converter 221 includes an APU start unit 223. The APU start unit 223 receives power from the DC bus 229 during an AC start or a battery start, and performs start of the APU 231A.

Figure 3:
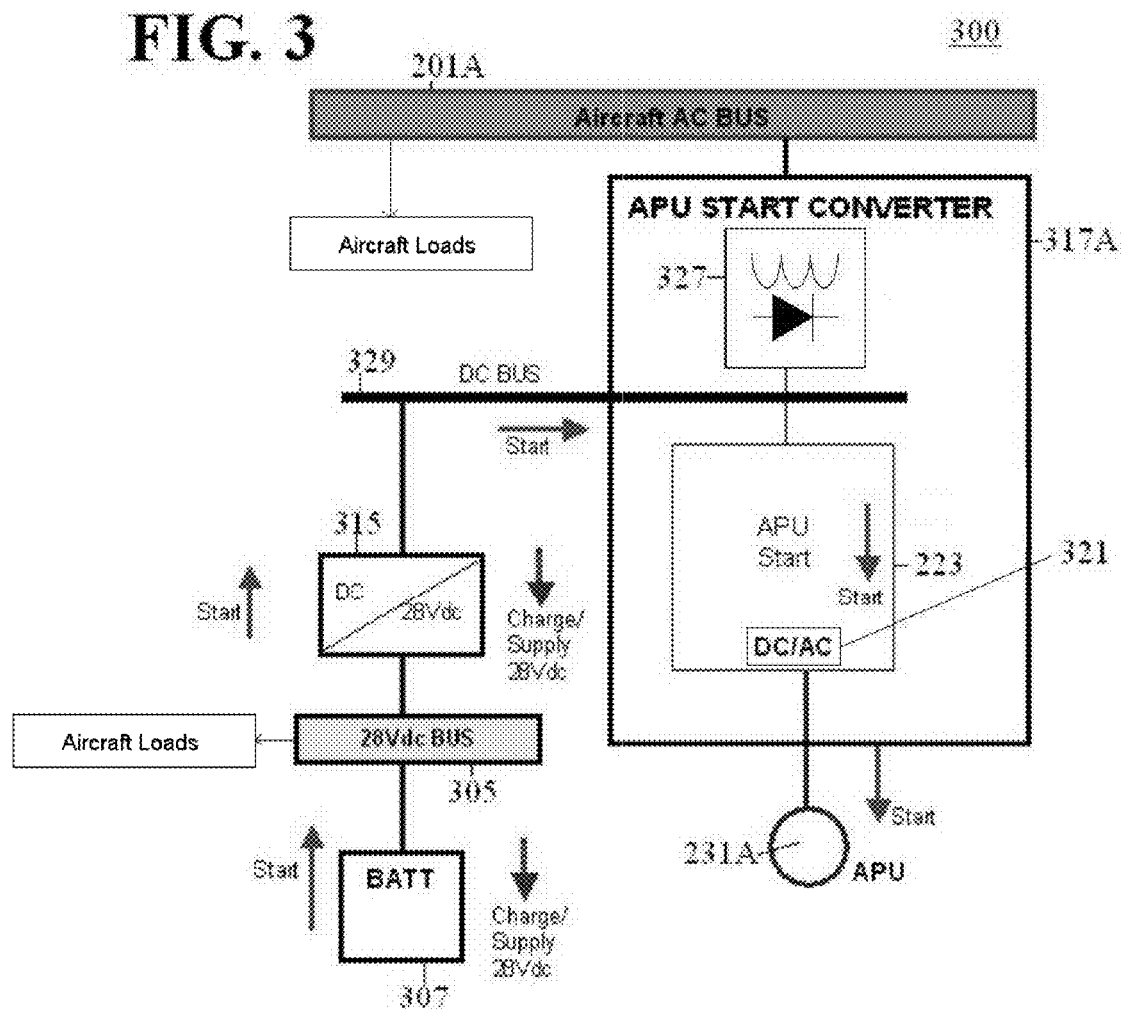
FIG. 3 is a block diagram illustrating an aerospace electrical power DC subsystem configuration using a multi-functional DC/DC converter according to an embodiment of the present invention.

FIG. 3 is a block diagram illustrating an aerospace electrical power DC subsystem configuration 300 using a multi-functional DC/DC converter 315 according to an embodiment of the present invention.

The aerospace DC subsystem 300 uses a multi-functional DC/DC converter 315. The multi-functional DC/DC converter 315 is used as main 28 Vdc supply source and battery charger when operating in one direction, and as a battery power converter to supply power to the DC/AC module 321 of the APU starting converter 317A, when operating in the opposite direction.

In one direction, herein also called the forward direction, the multi-functional DC/DC converter 315 receives DC power from the DC bus 329. The DC power of the DC bus 329 is received from the aircraft AC bus 201A, through the rectifier 327 included in the APU start converter 317A. In an exemplary embodiment, the AC input from the aircraft AC bus 201A may be a 3-phase AC voltage, such as, for example, 115 or 230 Vac at 400 Hz or variable frequency of 360 to 800 Hz. The rectifier 327 may be similar to rectifier 227 from FIG. 2, but any rectification systems may be used for the rectifier 327. The DC bus 329 may be one of multiple DC power buses of an aircraft power subsystem, such as, for example, a 270V, +/−270V bus. Various electrical loads and other elements may also be connected to the DC bus 329. The multi-functional DC/DC converter 315 converts the DC power received from the DC bus 329 into 28 Vdc, hence providing the main 28 Vdc supply source at the 28 Vdc bus 305, and charging the battery 307. The battery 307 is part of the backup power systems 105 of FIG. 1. The multi-functional DC/DC converter 315 also controls the output voltage going to the 28 Vdc bus 305, to be within a compliance range for the 28 Vdc power subsystem. This output voltage may also be controlled by the multi-functional DC/DC converter 315 such as to limit the amount of charging current, or to compensate for environmental conditions such as temperature. This power path is the "charge/supply 28 Vdc" power path in FIG. 3.

In an opposite direction, herein also called the reverse direction, the multi-functional DC/DC converter 315 receives power from the charged battery 307, through the 28 Vdc bus 305. The multi-functional DC/DC converter 315 then operates as a battery power converter, and converts the battery 28 Vdc output to DC power at the voltage level required for the DC bus 329, which then supplies power to the APU start unit 223 of the APU starting converter 317A. Power may also be supplied to other loads connected to the DC bus 329. This power path is the "start" power path in FIG. 3. The multi-functional DC/DC converter 315 may adjust and control the voltage output to the DC bus 329, based on a voltage condition for starting the APU 231A, and may control and limit the starting current of the APU 231A to a required level.

The multi-functional DC/DC converter 315 may independently start the APU 231A when the aircraft AC bus 201A is not operational. The multi-functional DC/DC converter 315 may also contribute to the start the APU 231A together with the operational AC bus 201A. In this case, the multi-functional DC/DC converter 315 receives power from battery 307, converts the 28 Vdc to DC power for the DC bus 329. Hence, the DC bus 329 receives power from both the AC bus 201A and the multi-functional DC/DC converter 315, for the APU start unit 223. Hence, the multi-functional DC/DC converter 315 may adjust its output for APU start based on state and availability of the AC bus 201A.

The multi-functional DC/DC converter 315 performs bi-directional conversion of power. The multi-functional DC/DC converter 315 performs multiple functions and replaces multiple devices from FIG. 2. When used in the forward direction to charge battery 307, the multi-functional DC/DC converter 315 eliminates the need for the battery charger 211 from FIG. 2. Also, when used in the forward direction to supply the 28 Vdc bus 305, the multi-functional DC/DC converter 315 replaces the TRU or RTRU 203 from FIG. 2. When used in the reverse direction to supply start power for the APU 231, the multi-functional DC/DC converter 315 eliminates the 28 Vdc to DC converter 225 from FIG. 2, because the 28 Vdc bus power has already been converted to the required DC power for the APU start unit 223.

The multi-functional DC/DC converter 315 may control its voltage outputs in the forward and reverse directions based on various parameters such as APU start condition, AC bus condition and availability, current level of APU start unit 223, load levels on the DC bus 329, current level of battery 307, temperature of battery 307, etc.

The multi-functional DC/DC converter 315 may be a standard buck-boost design DC/DC converter. The multi-functional DC/DC converter 315 may also be another type of DC/DC converter, such as a switched mode converter, a converter implemented with digital circuitry, analog circuitry, integrated circuitry, hybrid circuitry, etc.

A control system of the multi-functional DC/DC converter 315 recognizes the direction of operation for the converter, and controls the converter output accordingly. For example, the converter control system recognizes when the converter needs to operate in the "charge/supply 28 Vdc" power path to supply 28 Vdc, and in the "start" power path to supply a voltage at the level required by DC bus 329.

The multi-functional DC/DC converter 315 presented in the current application can be implemented in an aircraft power system, to perform multiple functions: provide a voltage output for a DC power bus to start an APU or other loads connected to the DC power bus; provide a voltage output for efficiently charging a battery; converting power from a battery to a voltage suitable for the DC power bus.

The multi-functional DC/DC converter 315 presented in the current application may be implemented as purpose built hardware such as FPGA, ASIC, dedicated integrated circuit card, etc. The multi-functional DC/DC converter 315 may be implemented as a software system/application, as hardware, or as a combination of hardware and software.

By incorporating multiple functions in a single unit, the multi-functional DC/DC converter 315 presented in the current application achieves multiple results: replaces and eliminates various units from typical/conventional power configurations such as, for example, the electrical configuration illustrated in FIG. 2; achieves significant weight, volume and cost savings as compared to systems requiring separate battery chargers and TRU/RTRUs for supply of main power; improves reliability for aerospace electrical power DC subsystem configurations; uses less Line Replaceable Units to achieve the same or better functionality in an aircraft electrical power DC subsystem; improves reliability and efficiency because additional Line Replaceable Units and associated switching devices are not needed in the power systems to connect/disconnect the charging battery to/from the DC power bus, and requires less control and power wiring; enables No-Break-Power-Transfers (NBPT) in the DC power subsystems during AC power interrupts or other system failures, because the backup battery can be continuously connected to the DC power bus to provide DC power.

The multi-functional DC/DC converter presented in the current application is not limited in use to the particular voltage levels or the particular number and types of loads illustrated, and can be used with any loads and voltage levels. For example, the multi-functional DC/DC converter presented in the current application may convert a DC voltage to a fixed magnitude DC voltage in any direction, for any value of the fixed magnitude DC voltage.

The multi-functional DC/DC converter presented in the current application may be used in aerospace DC subsystems, as well as other electrical system not related to aerospace systems. Hence, although some aspects of the present invention have been described in the context of aerospace applications, the principles of the present invention are applicable to any environments that use electrical power.

We claim:

1. A multi-functional apparatus for converting and regulating voltage in an aircraft, said apparatus comprising:
    a starter converter for starting an auxiliary power unit (APU) via the supply of an AC voltage and frequency wave;
    an AC to DC converter of the starter converter being connected to extract power from an AC bus at a first voltage, the AC bus at the first voltage supplying AC power to various AC loads on the aircraft;
    the starter converter having a DC bus connection therein;
    the AC to DC converter connected to extract power from the AC bus of the aircraft and deliver DC power to the DC bus connection;
    an APU start unit receiving DC power from the DC bus connection,
    the DC bus connection receiving power from
    a bi-directional DC to DC converter, connected to extract power from or deliver power to the DC bus connection of the starter converter,
    wherein said DC to DC converter
        is controlled to operate in a first direction to receive a DC power from the DC bus connection of the starter converter and to output DC power at a first regulated DC voltage adjusted to charge a battery, and
        is controlled to operate in a second direction to receive DC power at a battery DC voltage from said battery and to output DC power at a second regulated DC voltage to the DC bus connection of the starter converter, to power the starter converter independently or in combination with the AC bus of the aircraft.

2. The apparatus according to claim 1 wherein:
    the starter converter comprises a rectifier; and
    wherein the aircraft AC bus is operationally connected to the DC bus connection of the starter converter through the rectifier.

3. The apparatus according to claim 1,
    wherein the rectifier is part of an AC/DC rectifier system, and
    the APU is operationally connected to the DC bus connection of the starter converter by a DC/AC converter in the APU start unit.

4. An aircraft electrical power DC system, said system comprising:
    a battery; and
    a bi-directional DC to DC converter operating in a first direction and in a second direction, wherein
        in said first direction, said DC to DC converter receives DC power from a DC bus, the DC bus receiving power from an AC to DC converter in an APU starter converter operationally connected to an AC power bus, wherein the AC power bus supplies AC power to various AC loads on the aircraft, and outputs a first regulated DC voltage to a constant voltage bus to charge a battery, and
        in said second direction, said DC to DC converter receives DC power at a battery DC voltage from said battery and outputs DC power at a second regulated DC voltage, via the DC bus, to an APU start unit having a DC to AC converter therein, for starting an APU independently or in combination with said AC power bus.

5. The system according to claim 4, wherein said constant voltage bus is an aircraft main power 28 Vdc bus.

6. The system according to claim 4, wherein said bi-directional DC to DC converter is controlled to compensate temperature or variations in input feed voltage so that the output voltage is controlled to achieve the desired level.

* * * * *